United States Patent [19]

Nicolay

[11] Patent Number: 5,525,283

[45] Date of Patent: Jun. 11, 1996

[54] METHOD FOR PRODUCING FLAT, LAMINATED MOLDINGS BY BACK-EMBOSSING ACCORDING TO THE PREFORM METHOD

[75] Inventor: Albert Nicolay, Meinhard-Neuerode, Germany

[73] Assignee: Lignotock GmbH, Germany

[21] Appl. No.: 334,691

[22] Filed: Nov. 4, 1994

[30] Foreign Application Priority Data

Nov. 3, 1993 [DE] Germany .................. 43 37 697.5

[51] Int. Cl.⁶ .................................................. B29C 45/16
[52] U.S. Cl. .................................. 264/266; 264/255
[58] Field of Search .................................. 264/255, 259, 264/266, 320, 322, 328.12

[56] References Cited

U.S. PATENT DOCUMENTS

| | | | |
|---|---|---|---|
| 1,593,525 | 7/1926 | Copeland | 264/320 |
| 5,122,320 | 6/1992 | Masui et al. | 264/266 |
| 5,401,449 | 3/1995 | Hill et al. | 264/266 |
| 5,401,457 | 3/1995 | Valyi | 264/266 |

FOREIGN PATENT DOCUMENTS

| 4-67919 | 3/1992 | Japan | 264/266 |
|---|---|---|---|

*Primary Examiner*—Jill L. Heitbrink
*Attorney, Agent, or Firm*—Young & Basile

[57] ABSTRACT

A method for the production of laminated moldings, such as internal linings or panellings of motor vehicles and the like, and dimensionally stable parts in which a support part is provided with a surface lamination and in which initially a preform having the same volume as the support part, but not having the same surface area with respect to the final shaping, is produced. Utilizing the inherent production heat, the preform is then connected by pressure action to the lamination by back-embossing with the thermoplastic material of the support part and is given its final shape by material flow processes. The invention improves back-embossing in the production of laminated moldings in such a way that with reduced embossing forces the surface-unitary adhesion of the lamination to the support part is improved and the risk of bubble formation is eliminated. This is achieved in that preforms identical in volume to that of the support part and having the same contour shapes as the finished laminated molding and with a lattice-like structure at least in partial areas are subject to the material flow process so that the initially open lattice meshes of the preform are closed by local flow with the pressure application for the back-embossing process.

9 Claims, 4 Drawing Sheets

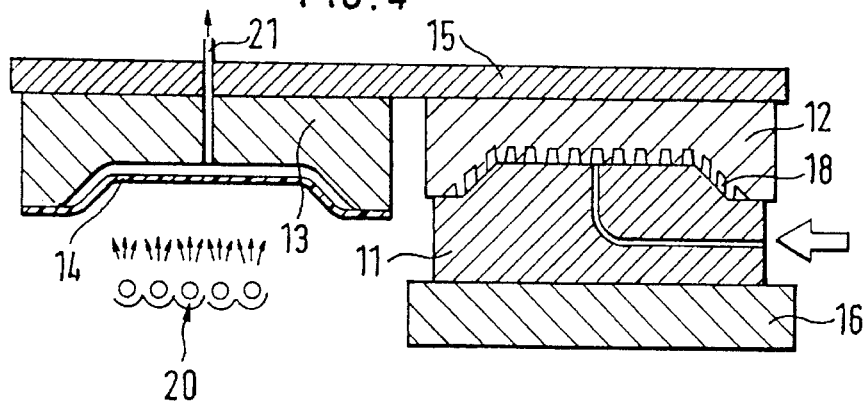
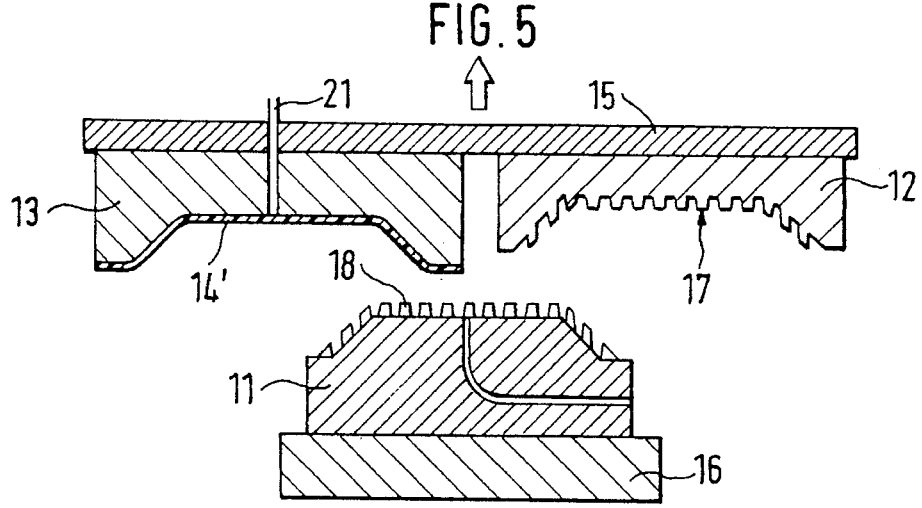
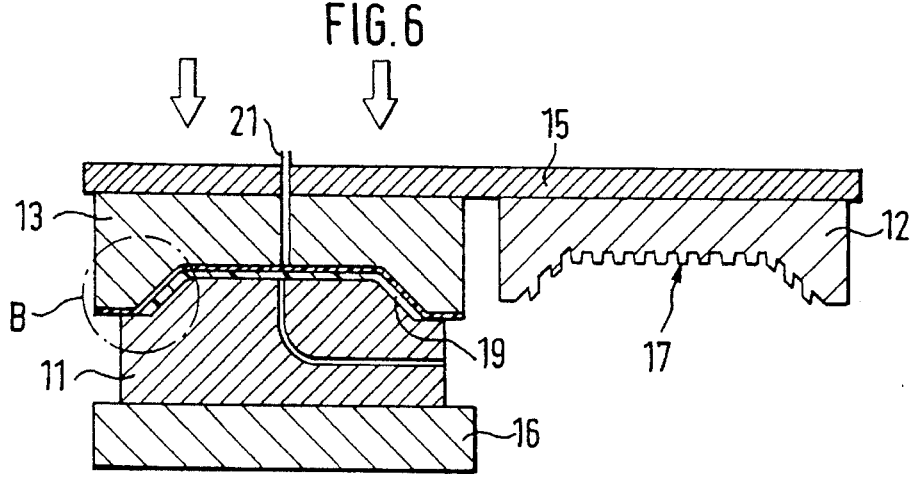

METHOD FOR PRODUCING FLAT, LAMINATED MOLDINGS BY BACK-EMBOSSING ACCORDING TO THE PREFORM METHOD

BACKGROUND OF THE INVENTION

The invention relates to a method for producing laminated moldings.

Such parts are, for example, used with advantage as inner lining or panelling parts for motor vehicles, but are also widely used in furniture making and in other industrial products.

The subsequently used term "back-embossing" relates to the lamination of random support parts with films or woven or nonwoven fabrics, in which during the initial process sequence a preform is, for example, produced from a thermoplastic material by injection molding or extrusion and whose volume corresponds to that of the finished support part, but whose surface dimensions are smaller than the surface area of the finished support part. In a separate process step, preferably the upper mold half with which the preform is produced is removed from the travel path for the production of the preform and the support part, together with a laminating film, and is completely embossed by means of a second, upper mold half, while retaining the use of the remaining mold means.

The finished embossing associated with material flow processes of the preform requires less contact pressure and lower temperatures than a direct and complete back-injection molding of the lamination in a closed injection mold. It also has the advantage of a more careful and gentle treatment of the possibly pressure and temperature-sensitive laminating material. In addition, the back-embossing permits the production of large-area parts, which is difficult or even impossible when using back-injection molding.

Previously, difficulties have been encountered in back-embossing which need to be overcome, particularly due to the long flow path during the finished or final embossing of the preforms and the associated significant embossing forces, as well as the tendency towards unsatisfactory marginal areas, which are frequently only inadequately shaped.

Long flow paths give rise to increased shear forces between the support material part and the lamination, so that it is not possible to reliably exclude undesired crease formations. There is also a risk of the formation of so-called flow cutting edges with the resulting mechanical weak points in the support part. Difficulties have also been encountered up to now as a result of the need to remove the air between the preform and the lamination during the embossing process, which leads to local bubble formations between the lamination and the support part. Additional problems have been caused in the past by different temperatures and therefore not always clearly defined adhesion conditions between areas of the preform surface and the flow areas during embossing.

The considerable advantages provided by back-embossing for the field of use of interest here must be balanced against the aforementioned difficulties and certainly preponderate. They in particular include the possibility of providing in material-uniform manner laminated moldings and therefore giving rise to clearly defined recycling conditions, which are otherwise scarcely possible with composites. The avoidance of solvent-containing lamination adhesives permits a particularly environmentally protecting and cost-effective manufacture. Lamination and shaping using essentially the same mold significantly simplifies manufacture and further reduces costs.

The problem of the present invention is to so improve back-embossing in the production of laminated moldings that with reduced embossing forces the surface-uniform adhesion of the lamination to the support part is improved and for this purpose the danger of bubble formation must be eliminated and additionally it must be possible to carry out a particular lamination which could not be achieved in the prior art.

SUMMARY OF THE INVENTION

Due to the fact that for back-embossing purposes use is made of preforms, which in the case of identical volume have the same outline as the subsequent support part and at least in partial areas have a lattice-like structure, the advantage is obtained that during the actual back-embossing the lattice meshes predefine the flow paths for the flow material. The preform material is distributed in whole-surface manner over all the support part surfaces by the material distribution in the lattice. A plurality of lattice meshes gives a corresponding plurality of flow areas of, for example, limited size, which can be uniformly or non-uniformly distributed over the support part surface.

The use of the method according to the invention leads to further advantages and the advantages indicated hereinafter are given only in an exemplified form.

The exact embossing of the support parts, particularly in the critical marginal areas, no longer creates difficulties because the necessary material is already distributed in defined form in the preform. The necessary adhesion conditions between the lamination and the support part are homogenized and improved over the entire surface. During embossing-closing of the lattice meshes precisely the desired material quantity passes out of the preform structure onto the joining surface between the support part and the lamination. During back-embossing, the flow material is sufficiently heated, particularly, it is hotter than the surface material and therefore adheres particularly well to the lamination. Thus, surface-distributed, high-strength adhesion zones are obtained, which significantly improve the quality and adhesiveness.

The air inclusions which lead to bubble formation in the lamination are reliably avoided. During back-embossing, the air collects at clearly defined points in the lattice meshes and can easily be removed therefrom by vent holes through the embossing tool. An improved venting by suction in critical mesh areas can be easily achieved.

If use is made of preforms, which have or require, in the case of identical volume with the support part, locally different mesh shapes and/or different thicknesses, then an additional possibility is created of influencing in a planned manner the adhesion of the lamination. Areas subject to a particular detachment risk can be additionally stabilized. By locally increasing the thickness it is possible to take account of further material requirements for integrally shaped components, e.g., for retainers and the like. Here again, the prior distribution of the material to be embossed over the entire support part surface due to the lattice structure and the resulting omission of long flow paths facilitate production and significantly improve quality. The lattice-like structure or at least partial structure of the blanks also makes it possible to introduce wire, fiber or strip-like reinforcing inserts into the entire or partial areas of the preform. This makes it possible to prevent, or at least significantly reduce, splintering in traffic accidents for the case where the laminated moldings are used as internal linings for cars. The deformation capacity of the moldings in the case of a vehicle impact up to breakage, i.e. impact deformation and force absorption, are also positively influenced.

The reduced embossing force resulting from the predefinition of the lattices and which must be used for final mold removal and the resulting relief for the decorative lamination make it possible to perform the preforming of the lamination at the same time as preform production directly in the laminating tool or mold and in this way it is possible to utilize part of the heat required for preshaping or preforming the lamination for the desired adhesion improvement between the lamination and the support part. In the method according to the invention with a whole-surface prior distribution of the support material there are only the desired, locally defined and limited flow processes. This makes it possible to perform back-embossing in multistage form and obtain partial lamination with a good quality.

Thus, for example, a material insert or decoration can be embossed in a lamination of thermoplastic material or the like and simultaneously it is possible to embed a border in a jointly embossed shadow joint. Subsequently the entire part, i.e. the already embossed-on material insert, can be covered with a laminating sheet or film and the remainder of the support part in completely back-embossed form and can be connected to the film or sheet. The marginal areas jointly pressed into the shadow joint give an optically clean and satisfactory transition. On the flank not covered by the material insert adhesion takes place of the laminating film, while it covers the material area without adhesion. Following the separation of the film lamination in the shadow joint the material insert area can be freed from the film portion covering it. The material insert and film abut one another in an optically satisfactory manner in the shadow joint without requiring additional measures, such as, for example, the hitherto necessary ornamental seam welds or strips for the transition area.

The preform production step is itself of a random nature and it is possible to use both injection molding processes and extrusion of suitable flowable materials or also the hot forming from planar, plate-like preliminary materials. The lattice-like structure of the preforms required for the method according to the invention can, for example, advantageously be produced by a suitable perforation of the preliminary material in the latter case.

BRIEF DESCRIPTION OF THE DRAWING

The invention is described in greater detail hereinafter relative to FIGS. 1 to 13, which show the process sequence for producing the molding according to the invention in diagrammatic exemplified form and wherein:

FIGS. 4 to 6 are the steps according to FIGS. 1 to 3, but for the method according to the invention;

DESCRIPTION OF THE PREFERRED EMBODIMENTS

Figure 1:
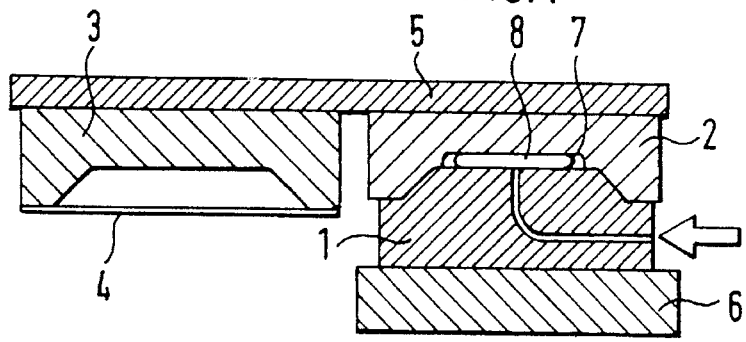
FIGS. 1 to 3 are three process step positions of the prior art back-embossing process.

In FIG. 1, reference number 1 depicts a lower mold with which is associated an upper mold 2 for preform production.

The material 8 for the preform 8' is injected into a contour 7 in the direction of the arrow (injection device not shown), which defines the preform 8'. The laminating upper mold 3 required for lamination is fixed together with the upper mold 2 on a support plate 5. The complete upper mold set formed by the components 2, 3 and 5 is movable horizontally by a suitable transfer device, not shown in the drawing, and vertically by an also not shown embossing press in which the mold set is fixed. The movement directions are indicated by arrows in FIGS. 1 to 3.

Figure 2:
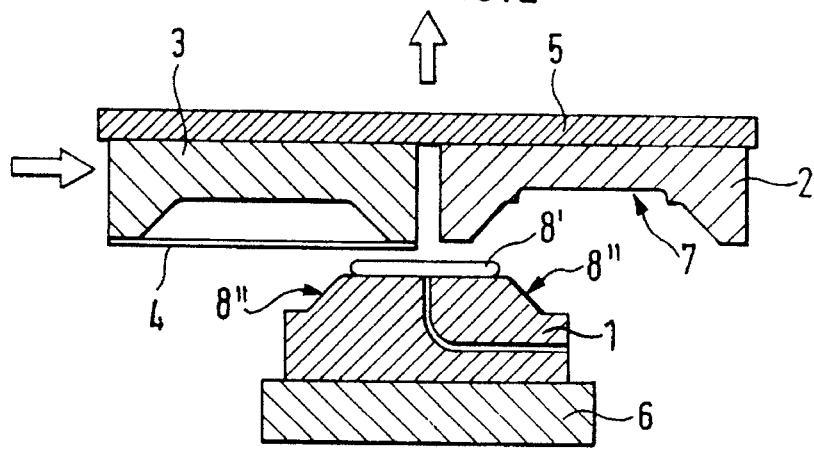

FIG. 2 shows an intermediate stage following the production of the preform 8'. The upper mold set (components 2, 3 and 5) is raised in the direction of the arrow. The laminating upper mold 3, which contains the lamination 4 in unshaped form, is moved in the direction of the vertical arrow over the lower mold 1 containing the preform 8', which is fixed with the aid of the base plate 6 in the laminating press. It is possible to see that the preform 8' is smaller than the subsequent part 9, the falling flanks 8" being re-formed in full length by flow processes.

Figure 3:
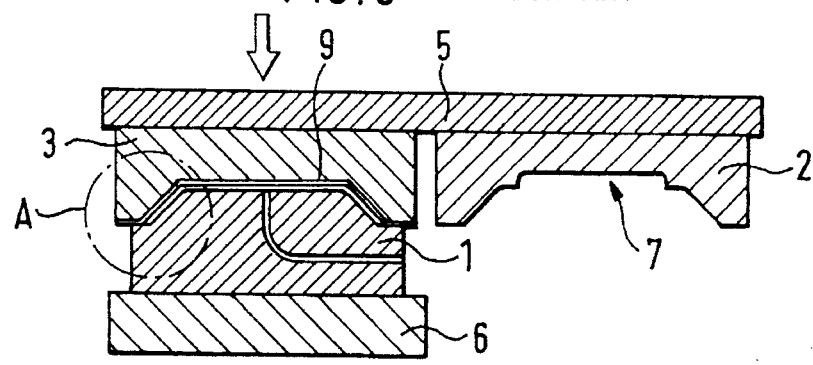

FIG. 3 illustrates the final method step in which the laminating upper mold 3 is lowered in the direction of the arrow, the lamination 4 being formed as the preform 8' is pressurized. Its large-surface flow leads to the finished back-embossed, laminated molding 9, which can subsequently be removed from the back-embossing and laminating mold formed by the lower and upper molds 1 and 3.

FIG. 4 depicts the joint lower mold 11, the upper mold for the injection molding of the preform 12 and the laminating upper mold 13. The upper mold 12 contains a lattice-like cavity 17 for producing a preform 18, which in this case covers the entire surface of the subsequent molding. The laminating upper mold 13 has a vacuum hole 21 with the aid of which the laminating film 14 is preformed or preshaped in the represented manner following its heating with the aid of the infrared radiator 20 and in the time in which the preform 18 is produced by the injection of thermoplastic material in the direction of the arrow.

The process sequence shown in FIGS. 5 and 6 corresponds to that of FIGS. 2 and 3 except for the flow processes of the preform during back-embossing and leading to the finished part 19.

Figure 7:
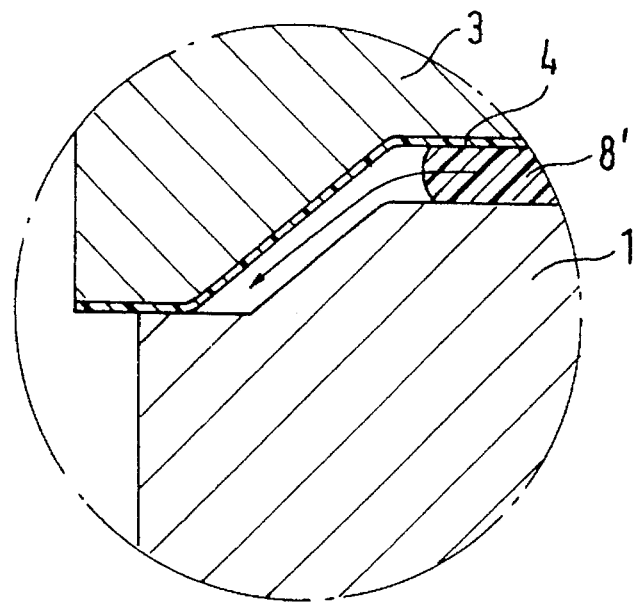
FIG. 7 is a larger-scale representation of area A in FIG. 3.

FIG. 7 illustrates the flow process during conventional back-embossing by means of a detail enlargement of area A in FIG. 3. The long flow paths of the preform material 8' up to the finished part are indicated by the arrow. For the lamination 4 this means increased shear stressing along the flow path with the resulting creasing tendency.

Figure 8:
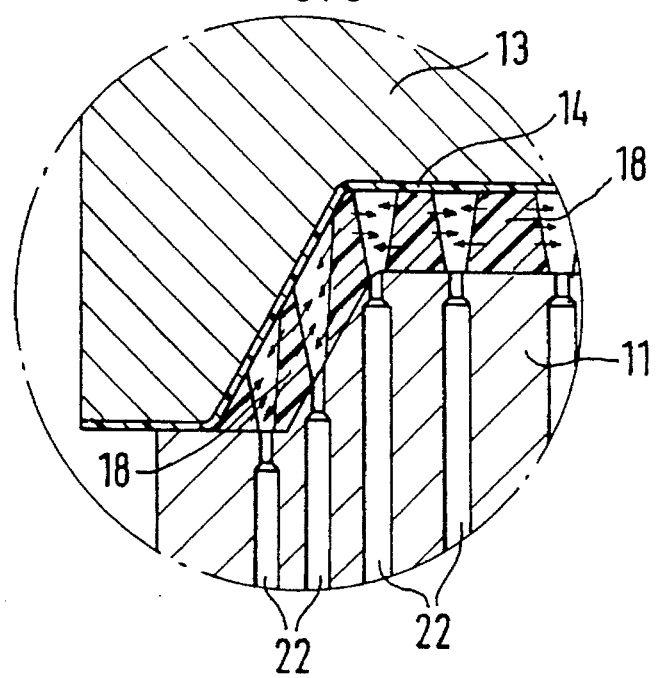
FIG. 8 is a larger-scale representation of area B of FIG. 6.

The situation is different in the procedure according to the invention, as shown in FIG. 8. The material lattice of the preform 18 extends into the marginal area of the subsequent finished part.

Flow during back-embossing only takes place in the lattice mesh direction (small arrows) and namely with flow paths of approximately the same magnitude as half the mesh width. The shear stressing of the laminating film 14 remains low and creasing risks are avoided. The air displaced on "embossing closed" of the lattice meshes of the preform 18 can escape through relief holes 22. The preform mesh shape is random per se. For reasons of simplified mold production preference is given to a circular cross section of the meshes. Concentricity can ensure the provision of removal bevels facilitating the removal of the preform from the mold. In addition, such bevels or slopes can ensure that the displaced air, during the "embossing closed" of the lattice meshes, is passed in the direction of the relief hole 22.

Figure 9:
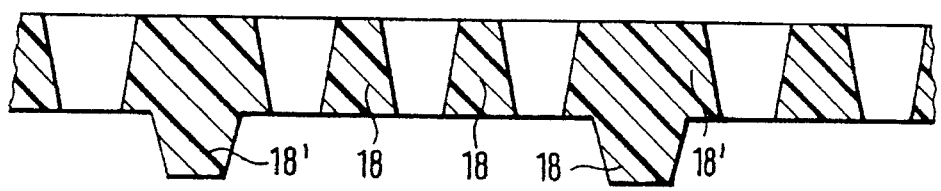
FIGS. 9 to 13 are different steps in the back-embossing operation with an additional material insert.

FIGS. 9 to 13 illustrate the method steps in the partial lamination by back-embossing according to the invention. The lattice-like preform 18 shown in detailed form has in the vicinity of a subsequent shadow joint 24 between the laminations 14 and 14' the thickened portions 18', which compensate for a material weakening in the vicinity of the shadow joint 24 (FIG. 9).

Figure 10:
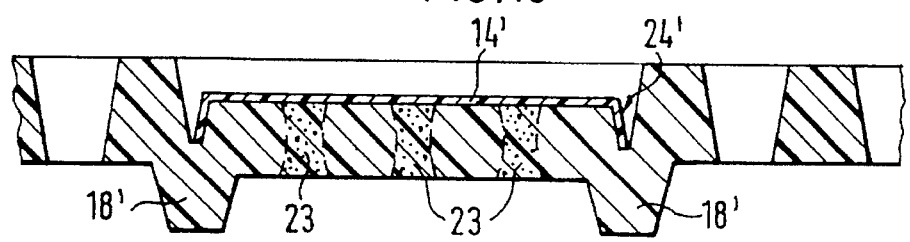
Figure 11:
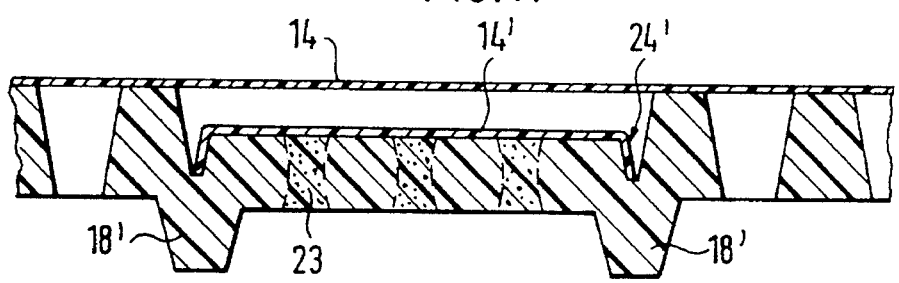
Figure 12:
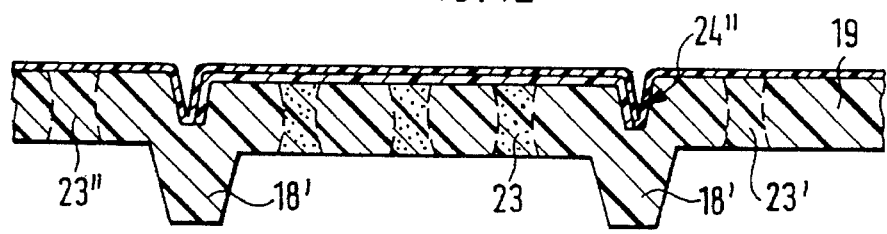

In a first embossing step, the blank of the material insert 14' of the partial lamination is back-embossed in a correct position manner, the lattice meshes of the preform being "embossed closed" in the areas 23 and the subsequent part 18 already has its final thickness. Outside this area there is no need for an embossing. The flank 24' of the subsequent shadow joint 24 is also shaped and the edge of the material insert 14' is connected to the flank 24' (FIG. 10).

In the next method step, the lamination 14, e.g. a film or sheet, is applied in whole-surface form (FIG. 11) and back-embossed. The shadow joint 24 is completely embossed and the film 14 is bonded to the still free flank 24" of the joint (FIG. 12) and then the remaining lattice meshes 23' and 23" are embossed closed and the molding 19 also acquires its final thickness at this point.

Figure 13:
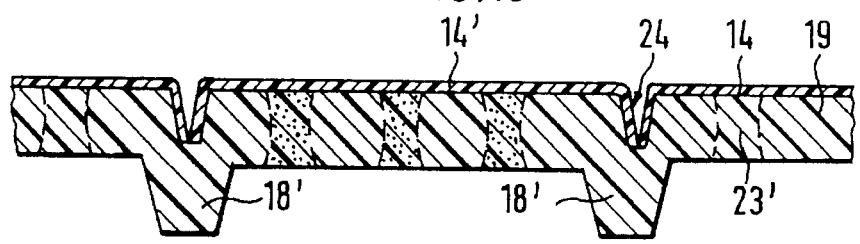

The film 14 is then cut through all around in the bottom of the completely embossed shadow joint 24 and the film area over the material insert 14' is removed (FIG. 13).

As can be gathered from FIGS. 9 to 13, when using lattice-like preforms, the back-embossing can be performed stepwise, which significantly increases the flexibility of the method. With respect to the embossing tools or molds, which are not shown in FIGS. 9 to 13, use can be made of equipment known from the prior art. In the represented procedure, the lamination 14 covers the expansion joint in the embossing tool, prevents the penetration of molding material and therefore ensures a troublefree tool or mold function.

I claim:

1. A method for the production of laminated moldings, having contour shapes in which a support part is provided with a surface lamination of thermoplastic material and in which firstly a preform is produced having the same volume as the support part but not having the same surface area with respect to the laminated molding wherein said preform is then connected, by using heat and pressure action, to the lamination by back-embossing with the thermoplastic material of the support part and is given a final shape by material flow processes, characterized by the steps of: subjecting a preform with the same volume as the support part and the same contour shapes as the laminated molding and with a lattice structure having initially open lattice meshes in at least partial areas to a material flow process so that the initially open lattice meshes of the preform are closed by local flow with the pressurization for the back-embossing process.

2. The method according to claim 1, further comprising the step of:

causing the preform with at least one of zonally different mesh shape and different thickness to undergo the material flow process.

3. The method according to claim 1, further comprising the step of:

introducing the preform together with additional components integrally shaped on a back of the preform into the process sequence.

4. The method according to claim 1 further comprising the step of:

embedding reinforcing inserts in the lattice structure of the preform before the preform undergoes the back-embossing process.

5. The method according to claim 1 characterized by the use of preformed laminating materials.

6. The method according to claim 1, further comprising the step of:

back-embossing at least two areas of the lamination formed of different laminating materials in at least two directly succeeding method steps, seams between partial laminations being embossed in the form of shadow joints.

7. The method according to claim 1 further comprising the step of:

venting the embossing tool during the back-embossing in the vicinity of the preform lattice meshes.

8. The method according to claim 1 further comprising the step of:

producing the preform directly prior to back-embossing by the forming of thermoplastic materials.

9. The method according to claim 1 further comprising the step of:

producing the preform directly prior to back-embossing by hot forming from planar, plate shaped starting material.

\* \* \* \* \*